United States Patent [19]

Kirk et al.

[11] Patent Number: 5,515,997

[45] Date of Patent: May 14, 1996

[54] COMPLIANT MOUNT FOR NECK OF COMPRESSED GAS CYLINDER

[75] Inventors: Kenneth G. Kirk, Placerville; Kris E. Baxter, El Dorado Hills, both of Calif.

[73] Assignee: Aerojet-General Corporation, Rancho Cordova, Calif.

[21] Appl. No.: 292,136

[22] Filed: Aug. 17, 1994

[51] Int. Cl.⁶ .................................................. B61D 5/02
[52] U.S. Cl. .................. 220/562; 410/42; 220/1.5; 220/481; 220/DIG. 24
[58] Field of Search ............... 410/32, 42; 248/129; 220/1.5, 23.4, 562, 581, 481, 480, 628, 629, DIG. 24

[56] References Cited

U.S. PATENT DOCUMENTS

| | | | |
|---|---|---|---|
| 2,380,562 | 7/1945 | Watson, Jr. | 220/564 |
| 3,479,043 | 11/1969 | Piehl | 410/42 |
| 3,594,894 | 7/1971 | Mayer, Jr. | 220/581 |
| 4,784,399 | 11/1988 | Finn | 410/42 |
| 5,385,263 | 1/1995 | Kirk et al. | 220/589 |
| 5,429,268 | 7/1995 | Hale et al. | 220/582 |

*Primary Examiner*—Stephen J. Castellano
*Attorney, Agent, or Firm*—Townsend and Townsend and Crew

[57] ABSTRACT

A mounting arrangement for securing the neck of a compressed gas cylinder to a bulkhead is designed to permit articulation of the cylinder axis relative to the bulkhead without placing undue stress on the cylinder neck. The mounting includes a ball-and-socket-type arrangement in which the bail is provided by a ring formed from a sphere with a cylindrical through-passage, the ring fitting over the cylinder neck, and the socket is provided by a pair of mated flanges with flared inner edges which together contact and capture the spherical curvature of the ring. The flanges are bolted to the bulkhead. An anti-rotation plate is also mounted to the bulkhead over the protruding end of the cylinder neck, permitting the cylinder neck freedom of motion in two orthogonal directions but not rotation.

15 Claims, 6 Drawing Sheets

5,515,997

COMPLIANT MOUNT FOR NECK OF COMPRESSED GAS CYLINDER

The field of technology to which this invention pertains is that of containers for compressed gases and the structures for mounting these containers to frames or manifolds.

BACKGROUND OF THE INVENTION

Compressed gas is transported and used in elongated cylinders which are sufficiently large to meet the needs of an operating facility. For operations where large volumes of compressed gas or a continuous supply are required, cylinders which measure about 20–40 feet in length and about 1–2 feet in diameter are used. These cylinders must be capable of retaining the high pressure of the gas and of meeting regulatory requirements for safety during storage, transport and use. Among these requirements are that the cylinders be able to withstand induced loads or stresses such as those which arise during their assembly and transport as well as those resulting from exposure to extreme environmental conditions. Dangers associated with these stresses include the risk of placing undue stresses on tube connections, valves and safety devices mounted to the cylinder ends, as well as the risk of damage to the cylinders themselves. The causes of these induced loads, particularly in modules or tube trailers containing several cylinders, include:

(1) Misalignment of the cylinders during assembly of the module, the misalignment having been caused by tolerances and other irregularities introduced during manufacture of the module.

(2) Tolerances in the manufacture of the cylinders themselves.

(3) Expansion and contraction of cylinders due to temperature and pressure change, including variations among individual cylinders.

(4) Flexure of the module frame and racking of the frame, i.e., twisting of one end relative to the other, during handling and transportation.

To withstand such stresses in cylinders of this size, a particularly strong construction is needed, and for this reason, high-strength steel is commonly used. Since the steel itself withstands the stress, the methods by which the cylinders are mounted to the module or truck bed are simple.

According to one of these methods, the cylinder neck is captured in a bulkhead by opposing jam nuts threaded onto the external surface of the neck. While this places the stress on the cylinder neck, the heavy steel construction of the neck accommodates the stress. This is acceptable for heavy steel cylinders, but not for cylinders of lower strength or fatigue resistance.

Another method involves the use of saddles to support the cylinders at intermediate locations along the lengths of the cylinders, with restraining straps to secure the cylinders to the saddles. A disadvantage of this method is that it places limits on how compact the packaging arrangement can be. Again, for steel cylinders, this is not a serious consideration, since the weight of these cylinders already limits the number of cylinders which can be combined in a single module. For cylinders of lighter material, however, compact packing is more important.

A mounting system which itself reduces the stresses of induced loads would be one which permits articulation of the cylinder relative to the bulkhead while maintaining a secure mounting connection. The system should accommodate small deviations of the cylinder axis from perpendicularity relative to the bulkhead, as well as movement in both horizontal and vertical directions. Rotation around the axis must be avoided, however, to preserve the seals on the tubing connections, and a secure mounting must be maintained. These and other problems and needs of the of cylinder mounting systems, particularly as applied to cylinders of a lighter weight than steel, are addressed by the present invention.

SUMMARY OF THE INVENTION

The cylinder mount of the present invention provides articulation capability through a combination of parts which collectively form a ball-and-socket-type system. The "ball" portion is supplied by a frustospherical outer surface of a ring which fits over the neck of the cylinder, and the "socket" portion is supplied by the axially-facing surfaces of two flanges which fit over and capture the ring. The flanges themselves are mounted to the bulkhead.

The term "frustospherieal" as used herein refers to the shape and curvature of the portion of a sphere between two parallel planes intersecting the sphere, the planes preferably positioned at opposite sides of, and at equal distances from, the center of the sphere. The outer surface of the ring which forms the ball of the ball-and-socket of the cylinder mount thus has the same curvature as a sliced, and preferably symmetrical, portion of a ball. The ring may be continuous, i.e., a single piece of construction, or discontinuous, i.e., divided into segments by one or more meridional planes (i.e., planes containing the center line) but forming a complete ring when assembled.

In certain embodiments of the invention, the ball-and-socket-type mount is constructed to permit the cylinder neck to slide axially relative to the mount, while in other embodiments, the mount is constructed to restrain the cylinder neck from axial movement. In the preferred arrangement for a cylinder having mounts at both ends of the cylinder, the mount at the service end of the cylinder is one which restrains the cylinder neck from axial movement relative to the mount, while the mount at the opposing end of the cylinder is one which permits the axial movement, which occurs upon expansion of the cylinder due to pressurization and thermal growth.

Bulkheads and tubing connections are generally intended for cylinders whose longitudinal axes are perpendicular to the plane of the bulkhead. When a cylinder has a longitudinal axis which deviates from this reference position, the ball-and-socket structure of this invention accommodates the deviation without imposing a load on the cylinder neck. For reasons stated in the preceding section of this specification, however, this accommodation is preferably made without also permitting the cylinder to rotate about its longitudinal axis. In preferred embodiments of this invention; therefore, the ball-and- socket-type cylinder mount is combined with an anti-rotation device which accommodates the deviations of the cylinder's longitudinal axis but prevents rotation of the cylinder about its longitudinal axis.

The anti-rotation device in these embodiments is a plate secured to the bulkhead and containing a specially shaped aperture for passage of the cylinder neck, preferably the end of the cylinder neck extending beyond the flanges. Due to the axial distance separating the aperture and the flanges, articulation of the cylinder inside the flanges results in radial displacement of the neck at the location of the anti-rotation plate. The shape of the aperture will limit the movement of the neck to one direction relative to the aperture, preferably a horizontal or vertical direction, with a vertical bulkhead as a reference. Freedom of movement in an orthogonal direction may then be incorporated into the mounting connection between the anti-rotation plate and the bulkhead. A convenient means of achieving this is in the use of bolts and elongated slots, the direction of the slots being perpendicular to the direction of movement permitted by the anti-rotation plate aperture. Thus, deviation of the cylinder axis from perpendicularity relative to the bulkhead is achieved with freedom of movement in two radial directions which are orthogonal to each other, while rotation of the cylinder about its axis is prevented.

These and other features and advantages of the invention will become apparent from the description which follows.

DETAILED DESCRIPTION OF THE INVENTION AND PREFERRED EMBODIMENTS

Figure 1:
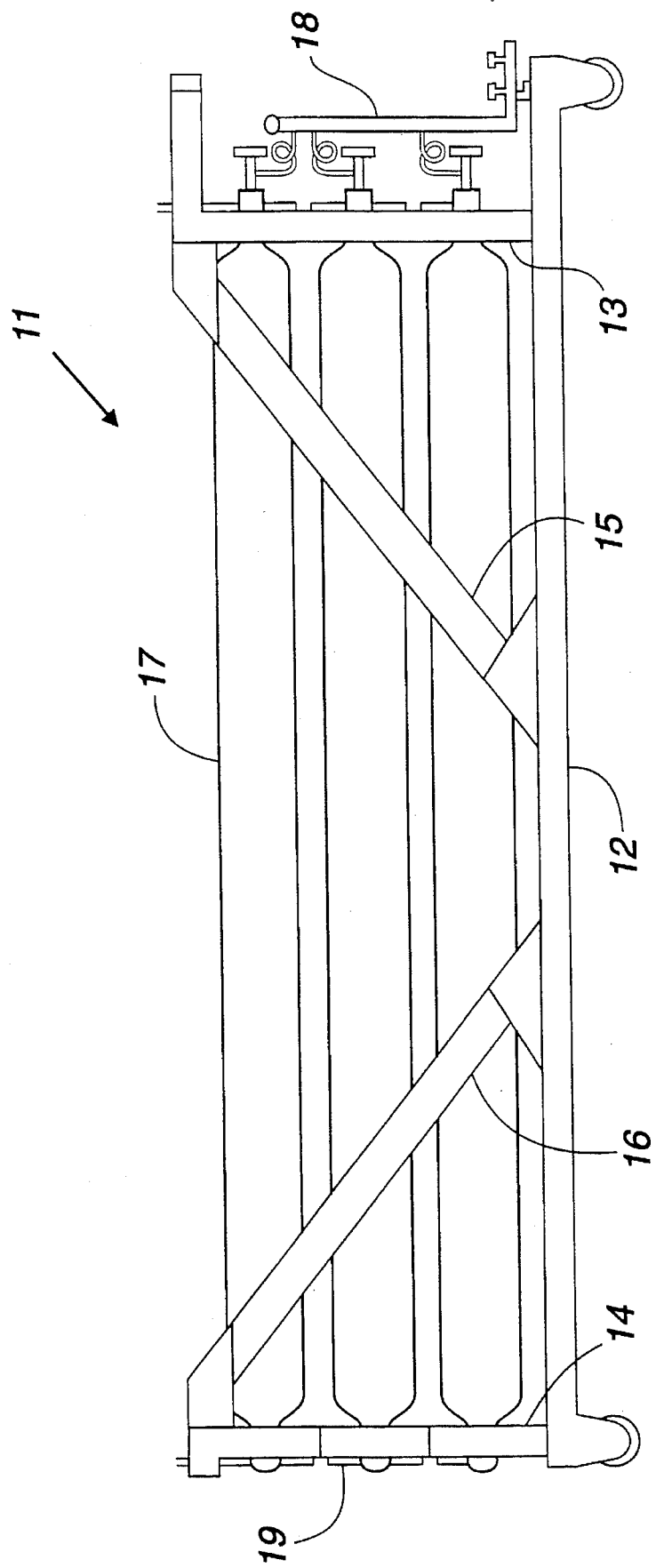
FIG. 1 is a side view of a compressed gas cylinder module into which the cylinder mount of the present invention can be incorporated.

This invention is applicable to cylinder mounts in general, including those which form part of a self-contained module useful for loading onto and unloading from a transport truck, and those which form part of a tank truck with a permanently truckmounted cylinder bank, as well as any structure in which bulkhead-mounted compressed gas cylinders are exposed or susceptible to externally imposed forces, environmental conditions or manufacturing tolerances and deviations which would tend to place loads on the cylinder necks. For a better understanding of the invention, however, certain specific embodiments of the invention are depicted in the drawings and described below in detail.

The structure depicted in FIG. 1 is one example which illustrates how the invention can be implemented. The structure is a mobile storage module 11 designed for easy loading and removal from a roll-on roll-off transport truck. The module is an assembly of high-pressure lightweight compressed gas cylinders mounted inside a common frame which includes manifolding. The module includes a base 12, and a forward bulkhead 13 and rear bulkhead 14, with angled stabilizer bars 15, 16. Spanning the distance between the bulkheads are a bank of compressed gas cylinders 17, each of which is supported at both ends solely by the bulkheads. A manifold 18 is mounted on the forward end of the module, for delivery of the compressed gas from the cylinders and for such additional functions as filling the cylinders, venting the cylinders for safety purposes, and monitoring the temperature and pressure of the cylinders. The cylinder ends which are mounted to the forward bulkhead are referred to herein as the service ends of the cylinders, or collectively the service end of the module. The opposite or rear ends of the cylinders protruding from the rear bulkhead 14 are also joined to a manifold 19, which contains vent lines and safety devices as required for cylinders exceeding a certain length.

Figure 2:
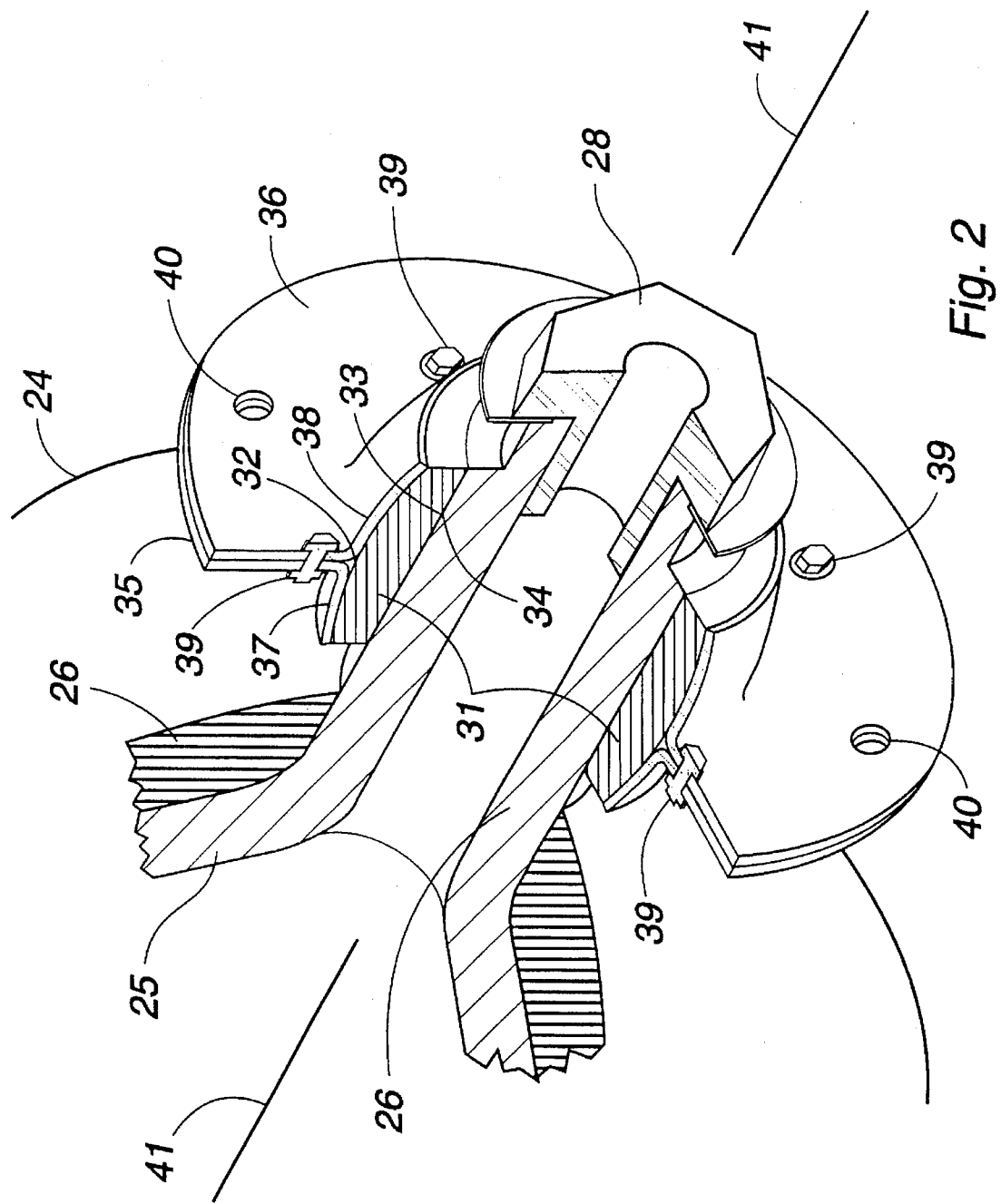
FIG. 2 is a perspective view in cross section of one end of a compressed gas cylinder in combination with a cylinder mount in accordance with the present invention.

FIG. 2 is an enlargement of one end of a cylinder, showing a portion of the cylinder mount. The drawing shows the cylinder 24, constructed of a core or liner 25 and an external winding 26 for purposes of providing stress resistance to the body of the cylinder. The neck 27 of the cylinder is an extension of the liner 25. The neck 27 is internally threaded, and an insert 28, externally threaded, is placed inside the end of the neck to provide a fitting compatible with valves and other fittings in the manifold.

The ring 31 with the frustospherical outer surface 32 encircles the neck, and has a cylindrical inner surface 33 (i.e., curved only in the tangential direction) contacting the cylindrical outer surface 34 of the cylinder neck. The width of the inner surface 33 of the ring is shorter than the corresponding surface 34 of the cylinder neck, so that the ring is permitted a small range of axial sliding along the cylinder neck. The ring is constructed of a low friction material such as a low friction thermoplastic or low friction metal. Optionally, the ring may be lubricated by application of an appropriate lubricant.

The flanges 35, 36 each have inner edges 37, 38 which flare outward, curving to complement the curvature of the frustospherical outer surface 32 of the ring. The flared inner edges 37, 38 together capture the ring by virtue of their curvature. The flanges are tightened against each other with bolts 39, and thus tightened, they compress the ring 31 against the cylinder neck 26. Additional bolt holes 40 in the flanges (only two of which are visible in this drawing) are included for securement of the flanges to the bulkhead.

With the frustospherical curvature of the contact surfaces between the ring 31 and flanges 35, 36, the cylinder 24 is free to articulate by having its longitudinal axis 41 rotate relative to the plane of the flanges. The plane of the flanges will be approximately parallel to the plane of the bulkhead. The fulcrum of the rotation will be at the location of the ring and flanges, and will cause radial movement of the forward end of the neck, i.e., the end receiving the insert 28.

Figure 3:
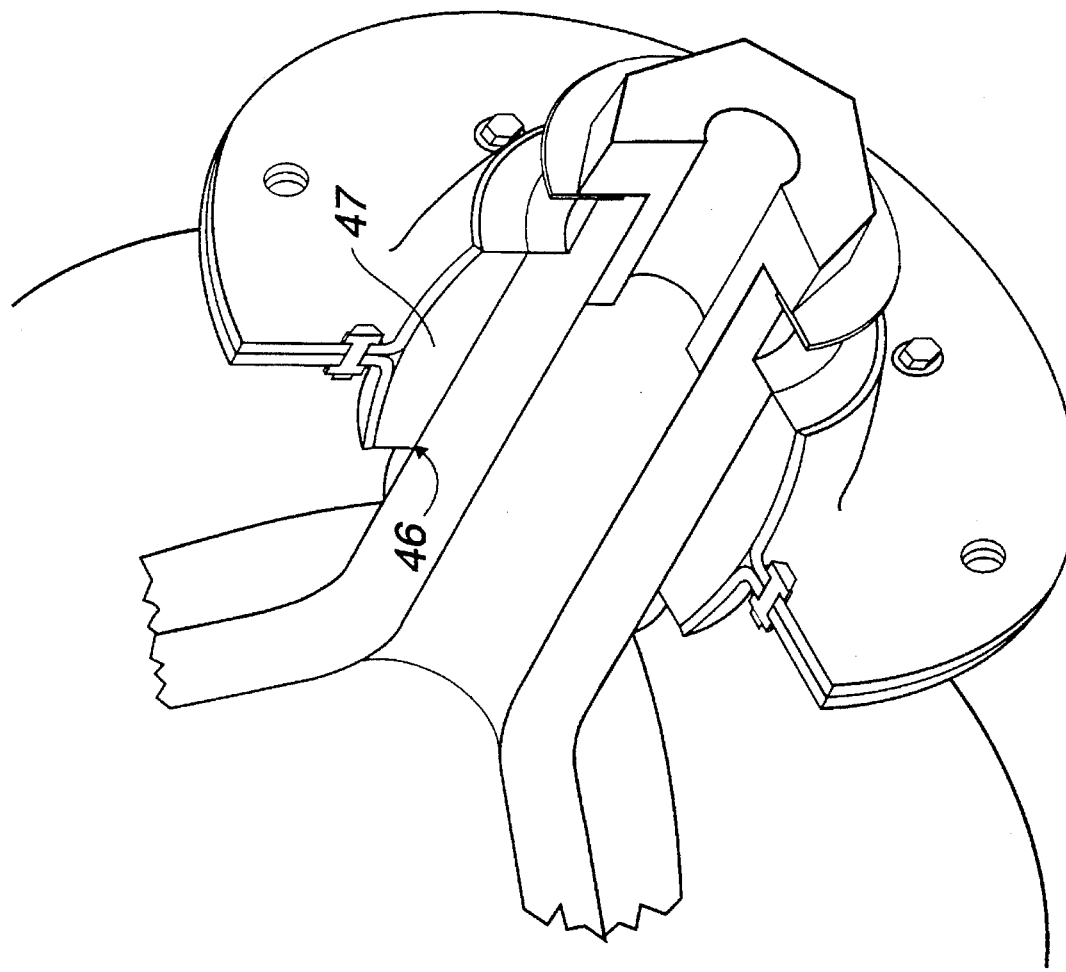
FIG. 3 is a perspective view in cross section similar to that of FIG. 2, illustrating a second cylinder mount in accordance with the present invention.

FIG. 3 depicts a mount similar to that of FIG. 1, but differing from the latter by not permitting axial mobility of the cylinder neck relative to the flanges and ring. In this mount, a circumferential recess 46 is machined into the cylinder neck, the recess being complementary in shape to the inner surface of the ring 47. The ring fits inside the recess, thereby eliminating axial mobility of the cylinder.

Figure 4:
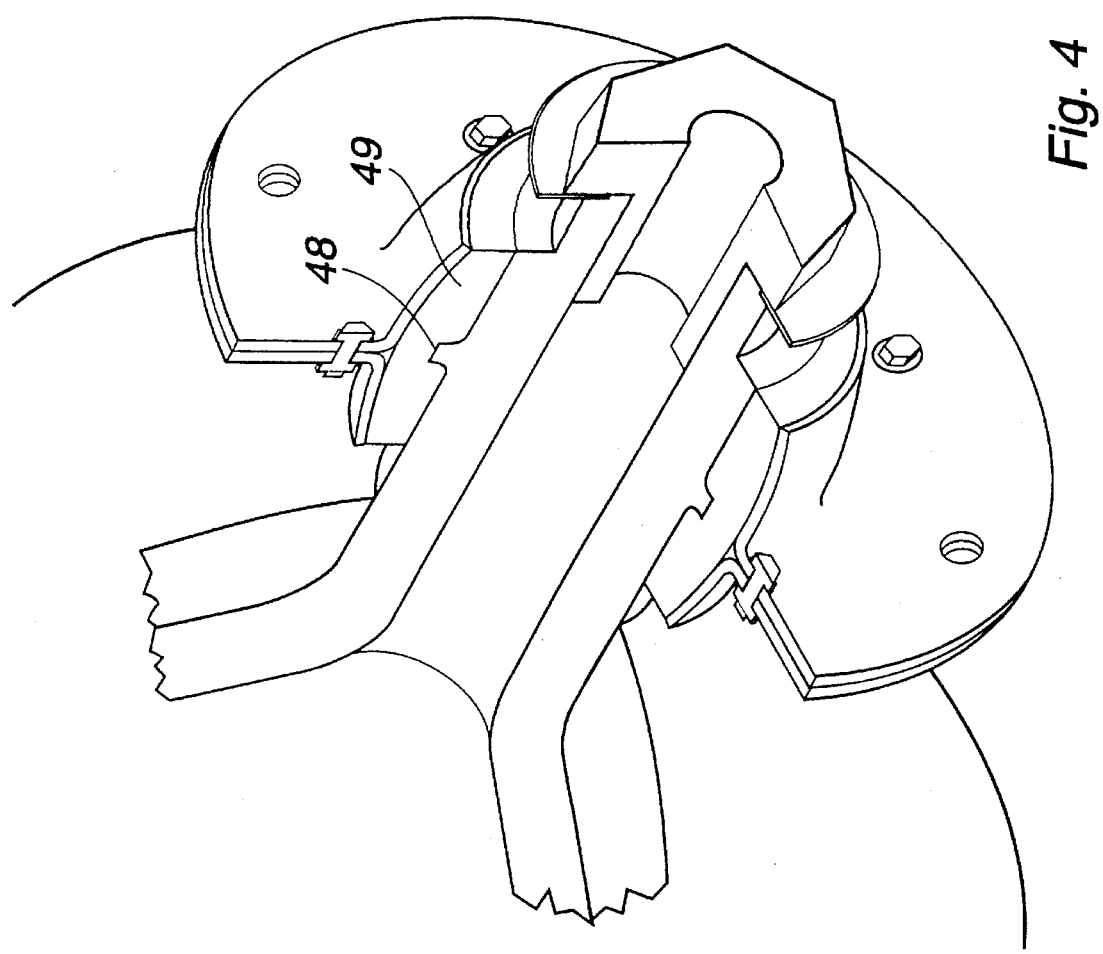
FIG. 4 illustrates a third cylinder mount in accordance with the present invention, again in a perspective cross section view.

The mount of FIG. 4 achieves the same effect by a circumferential ridge 48. A groove along the inner surface of the ring 49 receives the ridge, again eliminating axial mobility of the cylinder.

Figure 5:
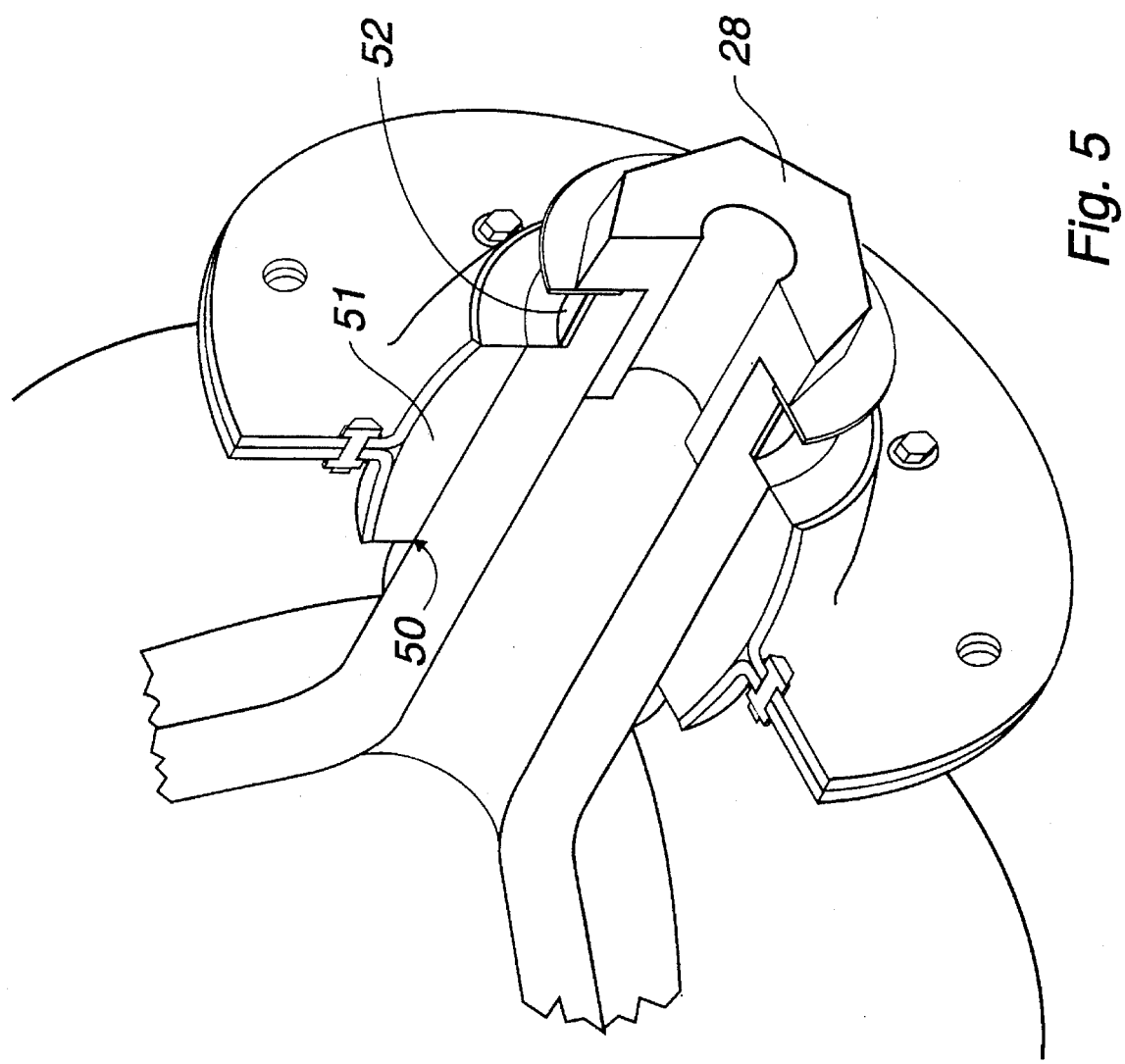
FIG. 5 illustrates a fourth cylinder mount in accordance with the present invention, again in a perspective cross section view.

The mount of FIG. 5 achieves the same effect in still another way. In this mount, a shoulder 50 is machined into the cylinder neck, with the ring 51 resting against the shoulder. The shoulder thereby limits the range of mobility of the cylinder in one direction. On the opposite side of the ring 51 is a spacer ring 52 which fits in the gap between the ball-surfaced ring 51 and the insert 28. Axial mobility is eliminated by the combination of the shoulder 50 and the spacer ring 52.

Figure 6:
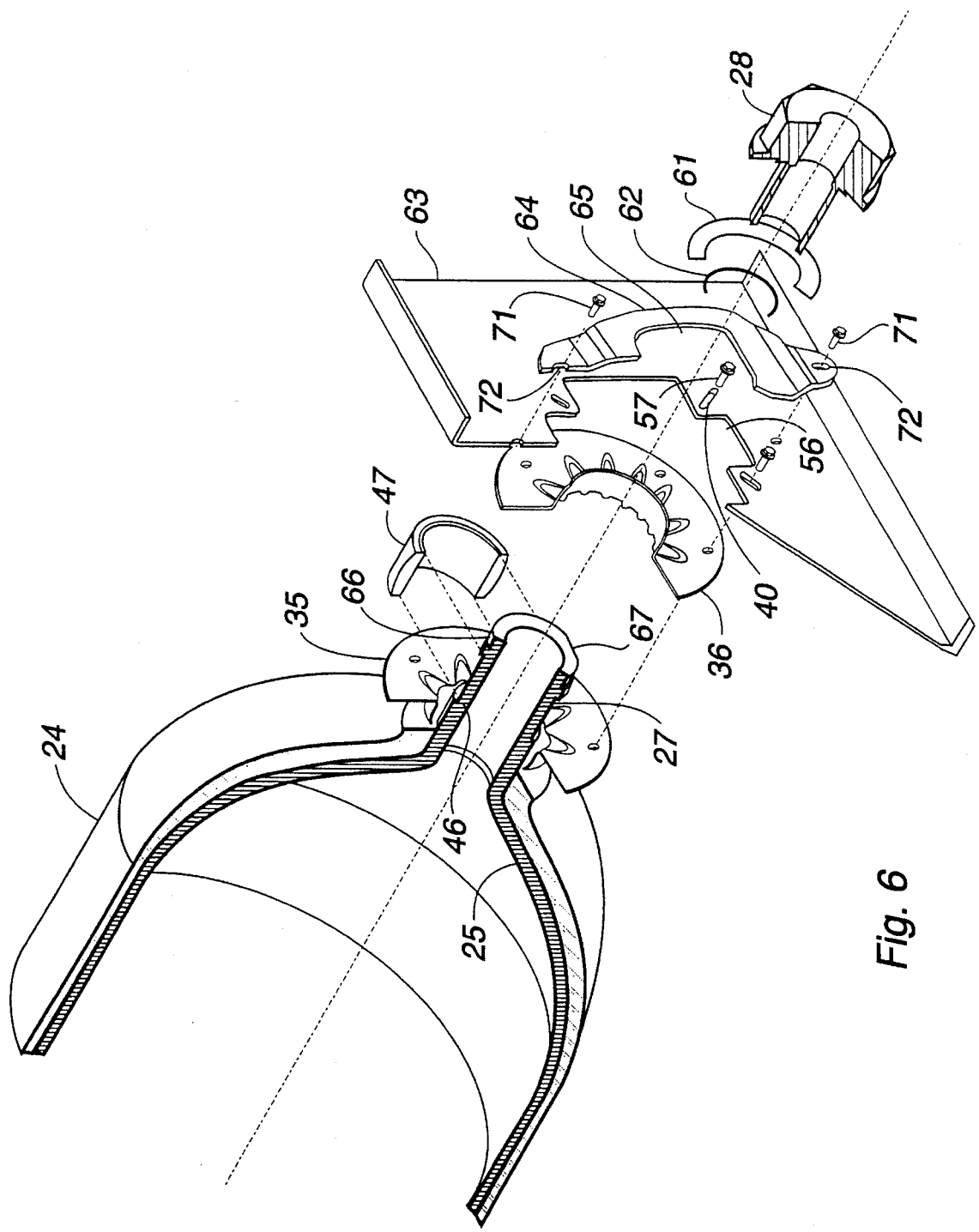
FIG. 6 is a perspective view in cross section showing the components of FIG. 3 together with a bulkhead and an antirotation device in accordance with the invention.

FIG. 6 illustrates the attachment of the flanges to the bulkhead and the incorporation of the anti-rotation device. The cylinder mount in this drawing is that of FIG. 3, and the drawing depicts the frustospherical-surfaced ring 47 as two halves, only one of the two halves being visible in full. An aperture 56 in the bulkhead permits passage of the cylinder neck 27, and bolts 57 spaced around the periphery of the aperture 56 secure the flanges to the bulkhead, using the bolt holes 40 in the flanges.

The two flanges 35, 36 are shown separated in this drawing, and the remaining parts include the cylinder 24, the insert 28 for placement inside the end of the cylinder, a lock washer 61 and O-ring seal 62 for placement between the insert and the cylinder end, the bulkhead 63, the anti-rotation device 64, and various bolts to secure the parts together.

The anti-rotation device 64 is a convexly shaped plate secured to the outer surface of the bulkhead 63. The plate contains an aperture 65 which is aligned with the aperture 56 in the bulkhead. The portion of the cylinder neck 27 which protrudes beyond the flanges extends through both apertures. This portion of the cylinder neck is machined to form flats 66, 67 or straight sections on the neck surface. There are two such flats, on opposite sides of the neck and parallel to each other. The anti-rotation plate aperture 65 has corresponding straight sections 68, 69 in its edge. The distance between these straight sections 68, 69 is slightly greater than the distance between the flats 66, 67 on the cylinder neck, thereby permitting the aperture to be readily slid over the cylinder neck, but not permitting rotation of one relative to the other. The straight sections 68, 69 of the aperture are however longer than the flats 66, 67 on the cylinder neck. Accordingly, when the cylinder neck extends through the aperture, gaps are left on each of the two lateral sides of the neck, permitting a limited range of lateral mobility of the neck within the aperture.

When the lock washer 61 is placed over the protruding end of the cylinder neck, it may be bent down over the flats 66, 67.

Mobility in the direction orthogonal to that afforded by the width of the aperture is achieved by the manner in which the anti-rotation plate 64 is mounted to the bulkhead 63. Mounting bolts 71 which secure the anti-rotation plate 64 to the bulkhead 63 pass through elongated slots 72 in the anti-rotation plate. In the arrangement and view shown in this drawing, the mobility afforded by the aperture 65 is in the horizontal direction, while the mobility afforded by the elongated slots 72 is in the vertical direction. The two in combination provide mobility to a limited range in all directions, while preventing rotation of the cylinder and cylinder neck relative to the bulkhead. The antirotation plate may alternatively be mounted in a position rotated 90°, with the straight sections 68, 69 being vertical rather than horizontal and the elongated slots 72 horizontal rather than vertical. The overall result is identical to that achieved with the arrangement shown in the drawings.

The materials of construction of the various parts shown in these drawings and discussed herein are not critical and may vary. In general, materials of construction which are commonly in use for tube fittings and compressed gas cylinder fittings may be used, except for the frustospherical-surfaced ring as indicated above. Also as indicated above, this invention is of particular interest in connection with lightweight compressed gas cylinders, such as those which are made of a material of construction having a density of less than about 5.0 grams per cubic centimeter (i.e., less than about 312 pounds per cubic foot), and preferably metals with densities of less than about 3.0 grams per cubic centimeter (i.e., less than about 187 pounds per cubic foot). Materials of particular interest are aluminum and aluminum alloys. The cylinders may be ten feet (3 m) in length or more and weighing less than about 100 pounds per foot of length (149 kg/m). The cylinders will most often be over fifteen feet in length (49 m) and from about 50 to about 75 pounds per foot of length (74 to 112 kg/m). Cylinders of this type may also be bound by fibers, notably carbon fibers and glass fibers, for axial and hoop reinforcement.

The foregoing is offered primarily for purposes of illustration. It will be readily apparent to those skilled in the art that the arrangements and configurations of the components of these cylinder mounts may be further modified in various ways from the particular examples disclosed herein without departing from the spirit and scope of the invention.

What is claimed is:

1. A compressed gas cylinder and mounting combination, comprising:

a compressed gas cylinder having a longitudinal axis and a cylinder neck at each end;

a pair of bulkheads; and a cylinder mount mounting at least one of said cylinder necks to one of said bulkheads in a manner permitting deviations of the longitudinal axis of said compressed gas cylinder from perpendicularity relative to said bulkhead while minimizing stress on said cylinder neck and maintaining a secure attachment of said cylinder neck to said bulkhead, each said cylinder mount comprising:

an encircling member sized to encircle said cylinder neck, said encircling member having an outer surface in the shape of a section of a sphere;

a pair of flanges adapted to be bolted together over said encircling member, and when so bolted to form a surface contacting, and complementary in curvature to, said outer surface to thereby capture said encircling member; and means for securing said flanges to said bulkhead.

2. A combination in accordance with claim 1 in which said encircling member and said cylinder neck encircled thereby each have cylindrical contacting surfaces, said contacting surface on said cylinder neck being of greater length than said contacting surface on said encircling member, thereby permitting said cylinder mount to slide axially along said cylinder neck.

3. A combination in accordance with claim 1 in which said combination further comprises means for preventing said cylinder mount from sliding along the axis of said cylinder.

4. A combination in accordance with claim 3 in which said means comprises a circumferential recess in said cylinder neck to receive said encircling member.

5. A combination in accordance with claim 3 in which said means comprises a circumferential ridge protruding from said cylinder neck and a complementary groove along the inner surface of said encircling member.

6. A combination in accordance with claim 3 in which said means comprises:

a shoulder on said cylindrical neck;

a spacer ring; and compressing means for compressing said encircling member between said shoulder and said spacer ring.

7. A combination in accordance with claim 1 in which said encircling member has a central axis, and is discontinuous by being split into two halves along a plane containing said central axis.

8. A combination in accordance with claim 1 in which the two ends of each said compressed gas cylinder are defined as a service end and a rear end, both of which narrowed to cylinder necks, and said combination comprises cylinder mounts at both ends, the cylinder mount at said rear end capable of sliding axially along the cylinder neck at said rear end, and said combination further comprises means at said service end for preventing said cylinder mount from sliding along the axis of said cylinder.

9. A combination in accordance with claim 1 in which said compressed gas cylinders are comprised of a material of construction having a density of less than about 3.0 grams per cubic centimeter.

10. A combination in accordance with claim 1 in which said compressed gas cylinders are comprised of aluminum or an aluminum alloy.

11. A combination in accordance with claim 1 in which a terminal portion of said cylinder neck protrudes beyond said flanges, and said combination further comprises a mounting plate secured to said bulkhead, said mounting plate containing an aperture adapted to receive said protruding terminal portion and to prevent rotation of said cylinder neck relative to said bulkhead.

12. A combination in accordance with claim 11 in which said terminal portion of said cylinder neck and said aperture have non-circular cross sections to prevent rotation of said cylinder neck relative to said bulkhead.

13. A combination in accordance with claim 11 in which said terminal portion of said cylinder neck and said aperture each have cross sections which include opposing linear segments separated by adjoining segments, the adjoining segments in said aperture separated by a distance exceeding the distance between the adjoining segments of said cylinder neck cross section, thereby permitting movement of said cylinder neck in a direction parallel to said linear segments while preventing rotation of said cylinder neck.

14. A combination in accordance with claim 11 in which said mounting plate is secured to said bulkhead by bolts passing through parallel elongated holes in either said mounting plate or said bulkhead, thereby permitting movement of said cylinder neck relative to said bulkhead while preventing rotation of said cylinder neck.

15. A combination in accordance with claim 11 in which said terminal portion of said cylinder neck and said aperture each have cross sections which include opposing linear segments separated by adjoining segments, the adjoining segments in said aperture separated by a distance exceeding the distance between the adjoining segments of said cylinder neck cross section, thereby permitting movement of said cylinder neck in a first direction parallel to said linear segments, and said mounting plate is secured to said bulkhead by bolts passing through parallel elongated holes in either said mounting plate or said bulkhead, said parallel holes being elongated in a second direction perpendicular to said first direction, thereby permitting movement of said cylinder neck in both said first and second directions while preventing rotation of said cylinder neck.

* * * * *